United States Patent
Kasberg et al.

(10) Patent No.: US 10,250,445 B2
(45) Date of Patent: Apr. 2, 2019

(54) AUTOMATIC LOAD BALANCING OF SWITCHES IN A CLUSTER OF CONTROLLERS IN A SOFTWARE-DEFINED SWITCH NETWORK

(71) Applicant: Lenovo Enterprise Solutions (Singapore) Pte. Ltd., New Tech Park (SG)

(72) Inventors: David W. Kasberg, Auburn, CA (US); Deepak Udapudi, Bangalore (IN); Mohammed A. K. Yasser, Bengaluru (IN)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 37 days.

(21) Appl. No.: 15/434,581

(22) Filed: Feb. 16, 2017

(65) Prior Publication Data
US 2018/0234296 A1 Aug. 16, 2018

(51) Int. Cl.
| H04L 12/24 | (2006.01) |
| H04L 12/26 | (2006.01) |
| H04L 12/803 | (2013.01) |
| H04L 12/933 | (2013.01) |

(52) U.S. Cl.
CPC ........ *H04L 41/0893* (2013.01); *H04L 47/125* (2013.01); *H04L 49/15* (2013.01); *H04L 43/0817* (2013.01); *H04L 43/0882* (2013.01)

(58) Field of Classification Search
CPC ....... H04L 45/38; H04L 45/42; H04L 47/125; H04L 69/22; H04L 43/10
See application file for complete search history.

(56) References Cited

U.S. PATENT DOCUMENTS

| 2014/0241247 A1* | 8/2014 | Kempf | H04L 12/4633 |
| | | | 370/328 |
| 2015/0009827 A1* | 1/2015 | Kawai | H04L 45/64 |
| | | | 370/235 |
| 2015/0009828 A1* | 1/2015 | Murakami | H04L 47/2441 |
| | | | 370/235 |

OTHER PUBLICATIONS

Hong Cheng, et al; "Per-flow Re-sequencing in Load-Balanced Switches by Using Dynamic Mailbox Sharing." IEEE Communications Society. ICC 2008. 978-1-4244-2075-9/08/$25.00.

* cited by examiner

*Primary Examiner* — Ayaz R Sheikh
*Assistant Examiner* — Debebe A Asefa
(74) *Attorney, Agent, or Firm* — Olive Law Group, PLLC

(57) ABSTRACT

Disclosed herein are systems and methods for automatic load balancing of switches in a cluster of controllers in SDNs. According to an aspect, the system comprises a network controlling device comprising at least one processor and memory. The network controlling device of the system is configured to receive a request to establish a connection from a switch residing in a switch network. The network controlling device of the system is also configured to determine whether a connection may be established between the switch and the network controlling device based on a load balancing policy for the network controlling device. The network controlling device of the system is also configured to determine another network controlling device residing in the switch network for establishment of the connection with the switch in response to determining the connection may not be established with the network controlling device.

18 Claims, 4 Drawing Sheets

AUTOMATIC LOAD BALANCING OF SWITCHES IN A CLUSTER OF CONTROLLERS IN A SOFTWARE-DEFINED SWITCH NETWORK

TECHNICAL FIELD

The presently disclosed subject matter relates to load balancing in a software-defined network (SDN). More particularly, the presently disclosed subject matter relates to automatic load balancing of switches in a cluster of controllers in a software-defined switch network.

BACKGROUND

SDNs typically include a number of network controllers configured to establish connections with one or more switches in the SDN. Each of these network controllers enable the switches to communicate on the SDN network. However, the number of switches managed by a network controller may grow indefinitely as more switches are added to the controller. Loads amongst the controllers within the SDN network may become unbalanced and lead to degradation of performance throughout the SDN network. For at least this reason, improved techniques for load balancing of switches in cluster of controllers in an SDN are needed.

SUMMARY

Disclosed herein are systems and methods for automatic load balancing of switches in a cluster of controllers in SDNs. According to an aspect, the system comprises a network controlling device comprising at least one processor and memory. The network controlling device of the system is configured to receive a request to establish a connection from a switch residing in a switch network. The network controlling device of the system is also configured to determine whether a connection may be established between the switch and the network controlling device based on a load balancing policy for the network controlling device. The network controlling device of the system is also configured to determine another network controlling device residing in the switch network for establishment of the connection with the switch in response to determining the connection may not be established with the network controlling device. The network controlling device of the system is also configured to communicate, to the switch, a message identifying the other network controlling device for the establishment of the connection with the switch.

According to another aspect, the method includes, at a network controlling device in a switch network, receiving a request to establish a connection from a switch residing in the switch network. The method also includes determining whether the network controlling device may establish the connection with the switch based on a load balancing policy for the network controlling device. The method also includes determining another network controlling device residing in the switch network for establishing the connection with the switch in response to determining the network controlling device may not establish the connection. The method also includes communicating, to the switch, a message identifying the other network controlling device for establishment of the connection with the switch.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Articles "a" and "an" are used herein to refer to one or to more than one (i.e. at least one) of the grammatical object of the article. By way of example, "an element" means at least one element and can include more than one element.

In this disclosure, "comprises," "comprising," "containing" and "having" and the like can have the meaning ascribed to them in U.S. Patent law and can mean "includes," "including." and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Unless otherwise defined, all technical terms used herein have the same meaning as commonly understood by one of ordinary skill in the art to which this disclosure belongs.

Figure 1:
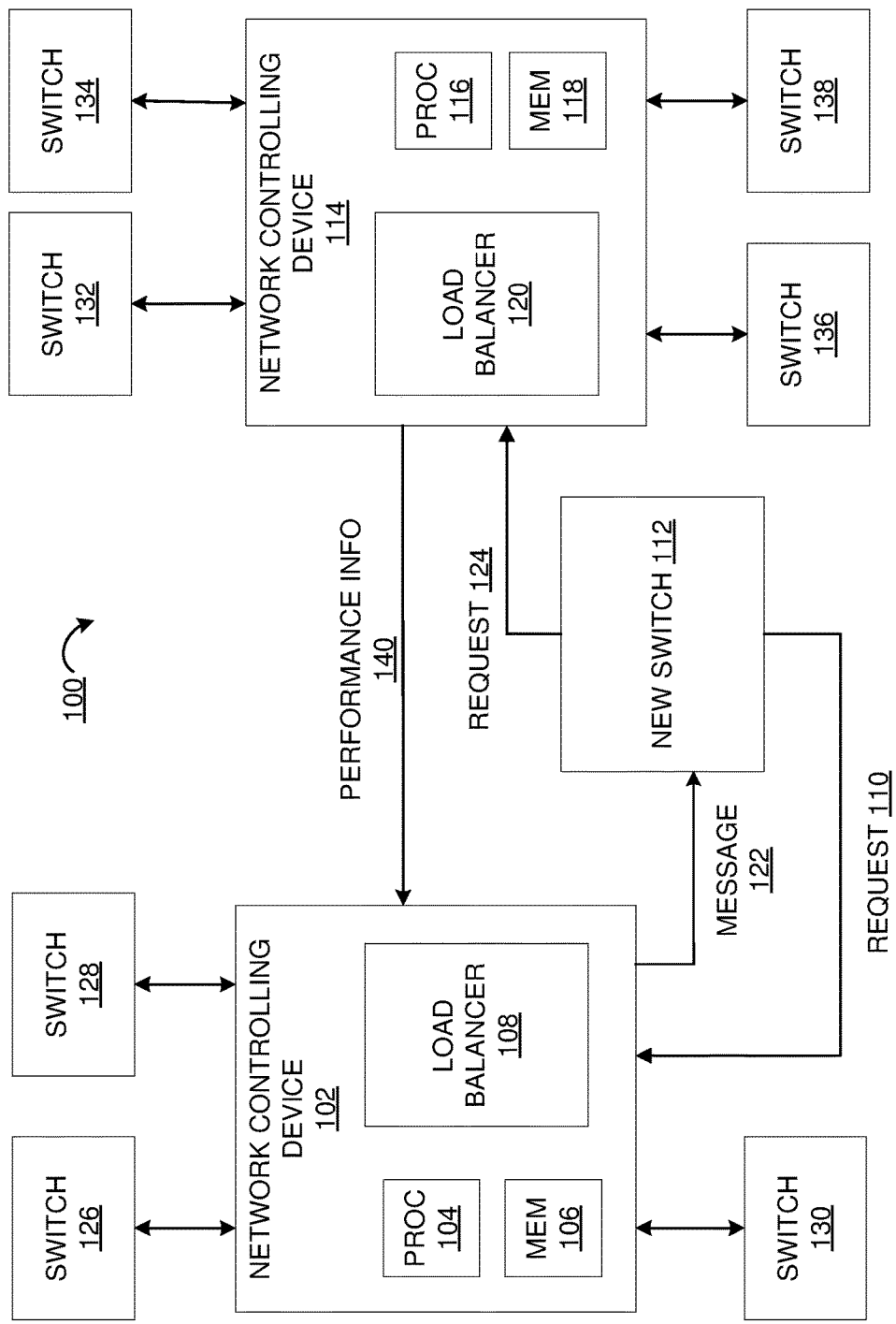
FIG. 1 is block diagram of an example system configured to automatically perform load balancing of switches in a cluster of controllers in a software-defined switch network in accordance with embodiments of the present disclosure.

The present disclosure is now described in more detail. Disclosed herein are a system and method for automatic load balancing of switches in a cluster of controllers in a software-defined switch network. The system of the present disclosure comprises a network controlling device comprising at least one processor and memory configured to execute the steps of the method discussed herein below. FIG. 1 illustrates an example system 100 configured to automatically perform load balancing of switches in a cluster of controllers in a software-defined switch network in accordance with embodiments of the present disclosure. As shown in FIG. 1, system 100 comprises a network controlling device 102 comprising a processor 104 and memory 106 configured to execute the steps of the method as discussed herein below.

Figure 2:
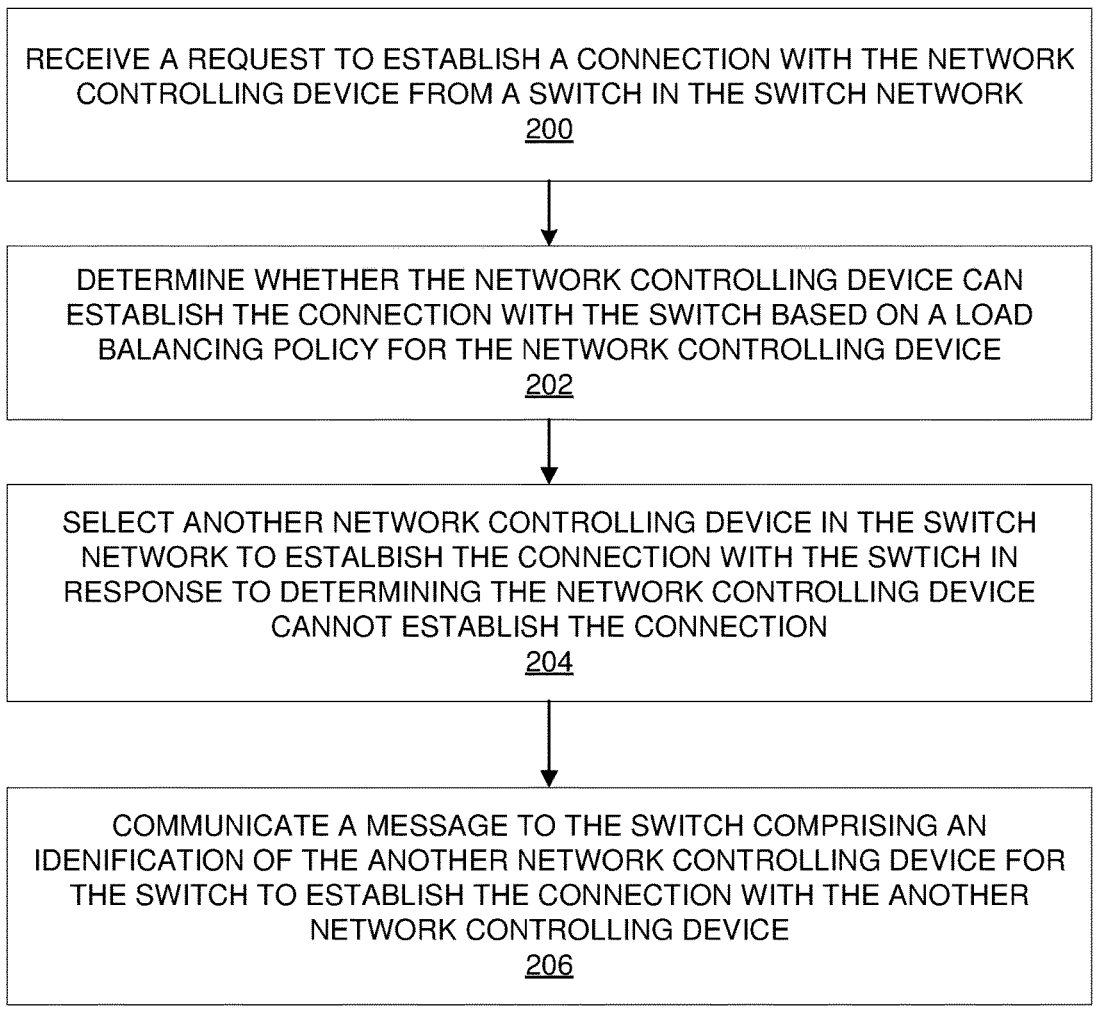
FIG. 2 is flow diagram of an example method for automatic load balancing of switches in a cluster of controllers in a software-defined switch network in accordance with embodiments of the present disclosure.

FIG. 2 illustrates a flow diagram of an example method for automatic load balancing of switches in a cluster of controllers in a software-defined switch network in accordance with embodiments of the present disclosure. Referring to FIG. 2, the method may include receiving 200 a request to establish a connection from a switch residing in the switch network. For example, FIG. 1 illustrates network controlling device 200 may receive a request 110 to establish a connection with network controlling device 200 from switch 112 in the switch network. In accordance with embodiments, the request may include a new switch connection message identifying the switch.

With continuing reference to FIG. 2, the method includes determining 202 whether the network controlling device may establish the connection with the switch based on a load balancing policy for the network controlling device. For example, FIG. 1 illustrates, network controlling device 102 comprises a load balancer 108 configured to determine whether the network controlling device 102 may establish the connection with switch 112 based on a load balancing policy stored within load balancer 108. In accordance with embodiments, memory 106 may also be configured to store the load balancing policy. In this implementation, load balancer 108 may also be configured to access memory 106 to obtain the load balancing policy. In accordance with embodiments, the load balancing policy may include one of a load balancing rule, a load balancing parameter, a maximum number of SSL connections and a maximum number of switches the network controlling device can establish with. Also in accordance with embodiments, the load balancing policy may include one of a maximum CPU utilization requirement and a maximum bandwidth utilization of switch ports of the network controlling device.

The method of FIG. 2 also includes determining 204 an other network controlling device residing in the switch network for establishing the connection with the switch in response to determining the network controlling device may not establish the connection. Continuing the aforementioned example, network controlling device 102 comprising load balancer 108 may be configured to determining other network controlling device 114 in the switch network 100 for establishing the connection with switch 112 in response to determining network controlling device 102 may not establish the connection with switch 112. FIG. 1 also illustrates network controlling device 114 also comprises a processor 116, memory 118, and its own load balancer 120.

Figure 3:
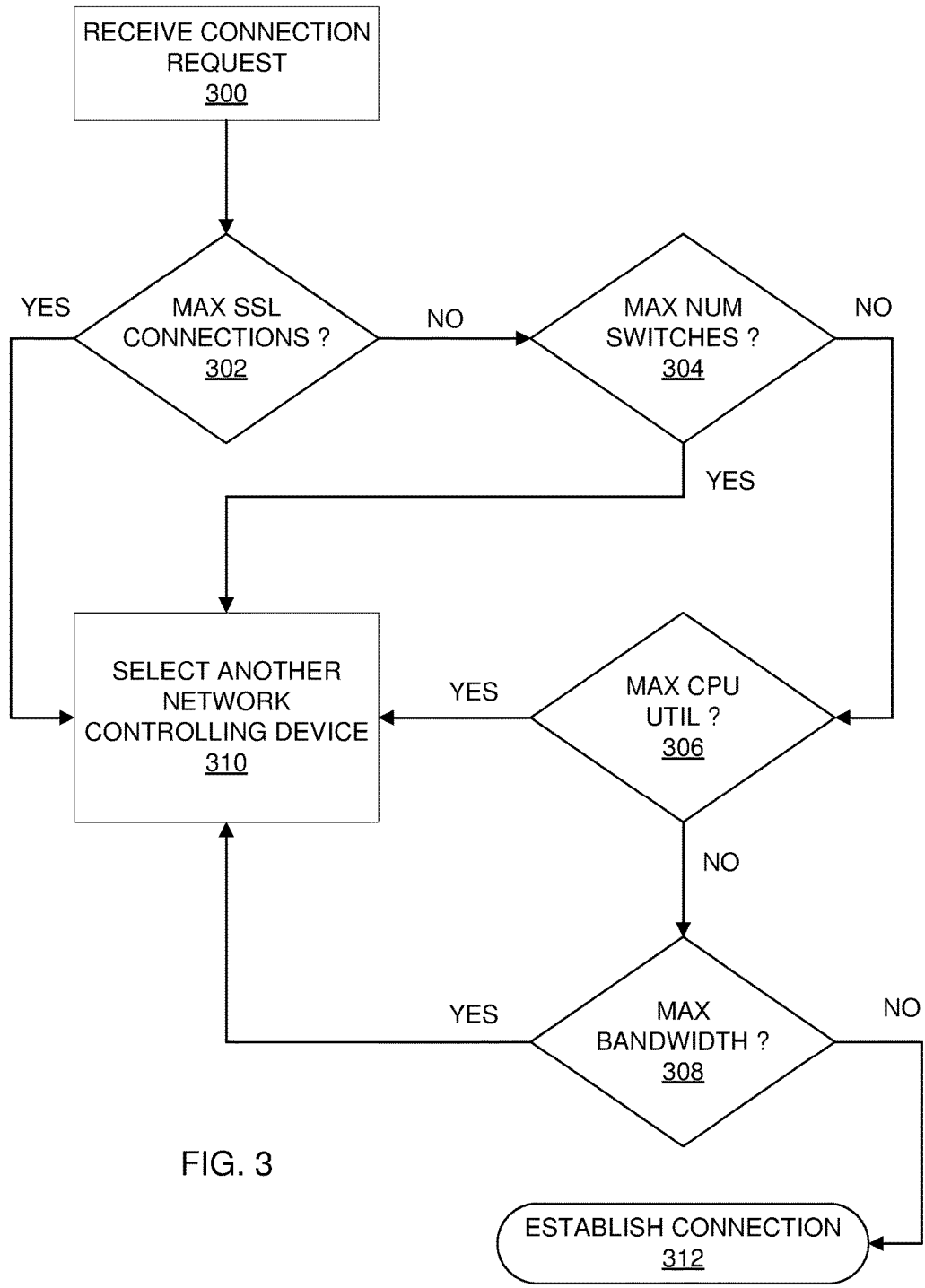
FIG. 3 is a flow diagram of an example method of determining whether the network controlling device may establish the connection with the switch based on a load balancing policy for the network controlling device in accordance with embodiments of the present disclosure.

FIG. 3 illustrates a flow diagram of an example method of determining whether the network controlling device may establish the connection with the switch based on a load balancing policy for the network controlling device in accordance with embodiments of the present disclosure. Referring to FIG. 3, upon receiving 300 the connection request, the method may include determining 302 whether the network controlling device has reached a maximum number of SSL connections the network controlling device can establish. For example, FIG. 1 illustrates load balancer 108 of network controlling device 102 may determine whether the network controlling device 102 has reached the maximum number of SSL connections that network controlling device 102 may establish with switches 126, 128, and 130. FIG. 3 also illustrates determining 310 an other network controlling device in the switch network based on a determination the network controlling device has reached the maximum number of SSL connections the network controlling device may establish. For example, FIG. 1 illustrates load balancer 108 of network controlling device 102 may select network controlling device 114 based on a determination that network controlling device 102 has reached the maximum number of SSL connections network controlling device 102 may establish.

The method also includes determining 304 whether the network controlling device has reached a maximum number of switches the network controlling device may establish a connection with. For example, FIG. 1 illustrates load balancer 108 of network controlling device 102 may determine whether the network controlling device 102 has reached a maximum number of switches the network controlling device 102 may establish a connection with. As shown in FIG. 1, network controlling device 102 may have established connections with switches 126, 128, and 130. Referring to FIG. 3, the method includes determining 310 an other network controlling device in the switch network based on a determination the network controlling device has reached a maximum number of switches the network controlling device may establish a connection with. For example, FIG. 1 illustrates load balancer 108 of network controlling device 102 may select network controlling device 114 based on a determination that network controlling device 102 has reached a maximum number of switches the network controlling device 102 may establish a connection with.

The method of FIG. 3 also includes determining 306 whether the network controlling device has reached a maximum CPU utilization requirement. For example, FIG. 1 illustrates load balancer 108 of network controlling device 102 may determine whether the network controlling device 102 has reached a maximum CPU utilization requirement. Returning to FIG. 3 the method may also include selecting 310 another network controlling device in the switch network based on a determination the network controlling device has reached a maximum CPU utilization requirement. For example, FIG. 1 illustrates load balancer 108 of network controlling device 102 may select network controlling device 114 based on a determination that network controlling device 102 has reached a maximum CPU utilization requirement of processor 104.

The method of FIG. 3 includes determining 308 whether the network controlling device has reached a maximum bandwidth utilization of switch ports of the network controlling device. For example, FIG. 1 illustrates load balancer 108 of network controlling device 102 may determine whether the network controlling device 102 has reached a maximum bandwidth utilization of switch ports (not shown) of the network controlling device 102. Returning to FIG. 3 the method may also include selecting 310 another network controlling device in the switch network based on a determination the network controlling device has reached a maximum bandwidth utilization of switch ports of the network controlling device. For example, FIG. 1 illustrates load balancer 108 of network controlling device 102 may select network controlling device 114 based on a determination that network controlling device 102 reached a maximum bandwidth utilization of switch ports (not shown) of the network controlling device 102.

The method of FIG. 3 includes establishing 312 the connection with the switch based on a determination the network controlling device may establish the connection with the switch based on a load balancing policy for the network controlling device. For example, network controlling device 102 of FIG. 1 may establish a connection with switch 112 based on the load balancing policy of load balancer 108.

Figure 4:
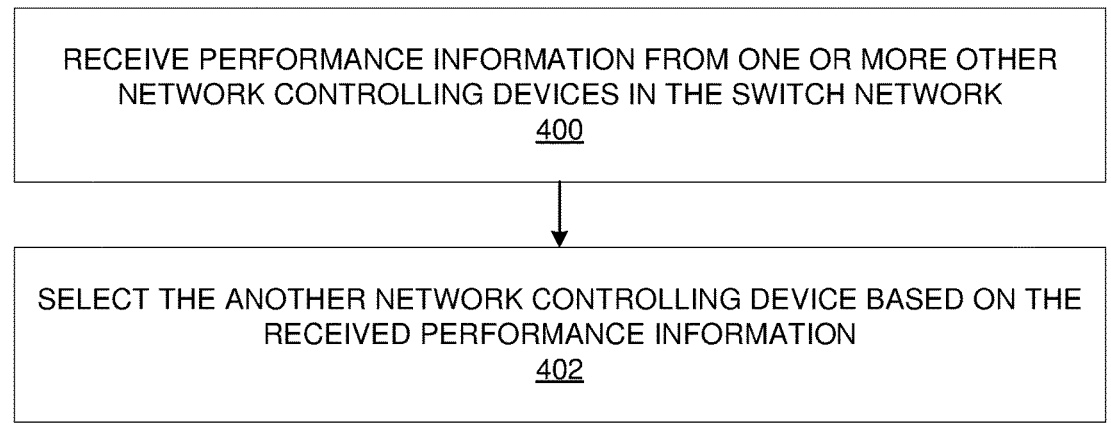
FIG. 4 is a flow diagram of an example method of determining an other network controlling device residing in the switch network for establishment of the connection with the switch in accordance with embodiments of the present disclosure.

FIG. 4 illustrates an example method of determining an other network controlling device residing in the switch network for establishing the connection with the switch in accordance with embodiments of the present disclosure. As shown in FIG. 4, the method may include receiving 400 performance information from one or more other network controlling device in the switch network. In accordance with embodiments, receiving 400 performance information may comprise receiving the performance information at regular intervals from the other network controlling devices. For example, FIG. 1 illustrates network controlling device 102 may receive performance information 140 from network controlling device 114 in switch network 100. In this example or an alternative example, network controlling device 102 may receive the performance information at regular intervals from network controlling device 114. It should be understood FIG. 1 illustrates a single other network controlling device 114 for illustrative purposes only. Thus, network controlling device 102 may be configured to receive performance information 140 from one or more other network controlling devices residing in switch network 100.

In accordance with embodiments, the performance information may comprise one of a load balancing policy and current operation status of each of the other network controlling devices. For example, the performance information 140 of FIG. 1 may comprise one of a load balancing policy and current operation status of network controlling device 114. For example, performance information 140 may comprise one of one of a maximum number of SSL connections and a maximum number of switches the network controlling device 114 may establish with. In the same example, performance information 140 may comprise a maximum CPU utilization requirement and a maximum bandwidth utilization of switch ports of the network controlling device 114.

With reference to FIG. 4, the method also includes selecting 402 the other network controlling device based on the received performance information. Performance information may include, but is not limited to, a set of user configurable variables and parameters on a load balancer policy file. The parameters may include, but are not limited to, CPU, memory, network parameters with a criteria allowing to set their priority based on high-low threshold and conditions to call out as "Low," "Moderate," "High," and "Over" on load for a given controller.

Returning to FIG. 2, the method also includes communicating 208, to the switch, a message identifying the other network controlling device for establishment of the connection with the switch. In accordance with embodiments, the method may comprise an open flow message. Also in accordance with embodiments, the open flow message may comprise one of a disconnect and reconnect open flow message. For example, FIG. 1 illustrates network controlling device 102 communicates message 122 to switch 112 for establishment of the connection with network controlling device 114. In this example, message 122 may comprise an open flow message. Continuing the example, open flow message 122 may comprise a disconnect and reconnect open flow message comprising an Internet protocol (IP) address of network controlling device 114. As an example, open flow messaging can be controlled or managed in a cluster of controller with a master controller owning the database for status and parameters values for all controllers. Further, synchronization may be maintained across suitable broadcast messages.

FIG. 1 also shows that switch 112 may communicate a request 124 to network controlling device 114 for establishment of a connection with network controlling device 114. In this example, network controlling device 114 establishes a connection with switch 112.

An advantage of the present disclosure includes network controllers of switch networks are enabled to maintain an optimum number of connections that can be managed by each network controller. Such an advantage eliminates processing overload amongst the network controllers. In addition, the present disclosure enables network controllers of a switch network to possess a faster response by the network controller in case of an I/O or some other operation since the load is properly distributed across the network controllers of the switch network.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the inventions. Indeed, the novel methods, devices, and systems described herein may be embodied in a variety of other forms. Furthermore, various omissions, substitutions, and changes in the form of the methods, devices, and systems described herein may be made without departing from the spirit of the inventions. The accompanying claims and their equivalents are intended to cover such forms or modifications as would fall within the scope and spirit of the inventions.

What is claimed:

1. A method, comprising:
receiving a request to establish a connection from a switch residing in a switch network;
determining whether a network controlling device may establish the connection with the switch based on a load balancing policy for the network controlling device;
determining whether a central processing unit (CPU) requirement and a bandwidth utilization requirement of at least one switch port of the network controlling device exceeds a predetermined threshold;
in response to determining the network controlling device may not establish the connection, determining another network controlling device residing in the switch network for establishing the connection with the switch;
in response to determining that the CPU requirement and the bandwidth utilization requirement exceeds the predetermined threshold, selecting another network controlling device in the switch network; and
communicating, to the switch, a message identifying the other network controlling device for establishment of the connection with the switch.

2. The method of claim 1, wherein the request comprises a new switch connection message identifying the switch.

3. The method of claim 1, wherein the switch network comprises a software-defined switch network.

4. The method of claim 1, wherein the load balancing policy comprises one of a load balancing rule, a load balancing parameter, a maximum number of SSL connections and a maximum number of switches the network controlling device can establish connection with.

5. The method of claim 1, wherein selecting another network controlling device comprises:
receiving performance information from one or more other network controlling devices in the switch network; and
selecting the other network controlling device based on the received performance information.

6. The method of claim 5, wherein the performance information indicates one of a load balancing policy and current operation status of each of the other network controlling devices.

7. The method of claim 5, wherein receiving performance information comprises receiving the performance information at regular intervals from the other network controlling devices.

8. The method of claim 1, wherein the message comprises an open flow message.

9. The method of claim 8, wherein the open flow message comprises one of a disconnect and reconnect open flow message.

10. A system comprising:
a network controlling device comprising at least one processor and memory that:
- receives a request to establish a connection from a switch residing in a switch network;
- determines whether a central processing unit (CPU) requirement and a bandwidth utilization requirement of at least one switch port of the network controlling device exceeds a predetermined threshold;
- determines whether a connection may be established between the switch and the network controlling device based on a load balancing policy for the network controlling device;
- determines another network controlling device residing in the switch network for establishing the connection with the switch in response to determining the connection may not be established with the network controlling device;
- in response to determining that the CPU requirement and the bandwidth utilization requirement exceeds the predetermined threshold, selecting another network controlling device in the switch network; and
- communicates, to the switch, a message identifying the other network controlling device for establishment of the connection with the switch.

11. The system of claim 10, wherein the request comprises a new switch connection message identifying the switch.

12. The system of claim 10, wherein the switch network comprises a software-defined switch network.

13. The system of claim 10, wherein the load balancing policy comprises one of a load balancing rule, a load balancing parameter, a maximum number of SSL connections and a maximum number of switches the network controlling device can establish connection with.

14. The system of claim 10, wherein the processor and memory:
- receives performance information from one or more other network controlling devices in the switch network; and
- determines the other network controlling device based on the received performance information.

15. The system of claim 14, wherein the performance information comprises one of a load balancing policy and current operation status of each of the other network controlling devices.

16. The system of claim 14, wherein receiving performance information comprises receiving the performance information at regular intervals from the other network controlling devices.

17. The system of claim 14, wherein the message comprises an open flow message.

18. The system of claim 17, wherein the open flow message comprises one of a disconnect and reconnect open flow message.

* * * * *